US006154123A

United States Patent [19]

Kleinberg

[11] Patent Number: 6,154,123

[45] Date of Patent: Nov. 28, 2000

[54] DRIVER ALERTNESS MONITORING SYSTEM

[75] Inventor: Raymond Kleinberg, Sterling Heights, Mich.

[73] Assignee: Breed Automotive Technology, Inc., Lakeland, Fla.

[21] Appl. No.: 08/924,562

[22] Filed: Sep. 5, 1997

[51] Int. Cl.[7] .......... B60Q 1/00

[52] U.S. Cl. .......... 340/436; 340/576; 340/903; 342/71; 367/909; 180/169

[58] Field of Search .......... 340/436, 435, 340/901, 903, 904, 575, 576; 180/169, 167, 168, 170; 342/70, 71, 72; 367/909

[56] References Cited

U.S. PATENT DOCUMENTS

| | | | |
|---|---|---|---|
| 4,673,913 | 6/1987 | Akita et al. | 340/575 |
| 5,402,108 | 3/1995 | Tabin et al. | 340/575 |
| 5,559,495 | 9/1996 | Cochran | 340/575 |
| 5,691,693 | 11/1997 | Kithill | 340/575 |
| 5,694,116 | 12/1997 | Kojima | 340/575 |
| 5,714,925 | 2/1998 | Lee et al. | 340/575 |

*Primary Examiner*—Nina Tong
*Attorney, Agent, or Firm*—Markell Seitzman

[57] ABSTRACT

A driver alertness monitoring system for motor vehicles which issues visual or audible signals to the driver, and which monitors visual, audible or mechanical responses received from the driver to determine driver alertness. An electronic control unit, preferably incorporated in the circuitry of existent vehicle safety systems, controls the activation of these visual or audible signals and determines appropriate actions based on the response of the driver. The system includes auxiliary sensors which can be used to control and modify the function of the system to reduce unnecessary activation.

2 Claims, 2 Drawing Sheets

DRIVER ALERTNESS MONITORING SYSTEM

BACKGROUND AND SUMMARY OF THE INVENTION

The present invention generally relates to a system for monitoring the state of alertness of a driver.

Studies have shown that lack of driver awareness and alertness can contribute to the number of accidents, particularly for long-distance heavy truck drivers who spend many hours on the road. Lack of alertness may delay a driver's response to a traffic condition by only a fraction of a second. Different methods have been proposed for monitoring the alertness of the driver, including position measuring sensors that track eye movement, steering wheel activation sensors to monitor movement of the steering wheel, heart rate sensors that attempt to determine if a driver is falling asleep, etc. These methods have not yet found wide acceptance in commercial applications either because of cost or reliability. Alternate systems have also been proposed which provide a visual activation of some device at set intervals, and then wait for the driver to activate some switch to indicate awareness. U.S. Pat. No. 5,012,226, describes such a system. The present invention improves upon such a driver awareness system by using voice or sound generation and recognition technology along with other auxiliary sensor inputs to minimize the inconvenience for the driver while maximizing effectiveness.

This invention consists of four main subsystems that provide for monitoring the state of alertness of the driver and control appropriate reaction methods. The first subsystem is the central control unit, which can be integrated with other vehicle electronics such as the air bag crash sensor, and may consist of one or more devices. This first subsystem serves to activate the visual or audible signals supplied to the driver, such as an indicator lamp or speech generation circuit, either randomly or at preset time intervals, and then to evaluate the response of the driver in relation to the condition of any auxiliary sensors. The second subsystem consists of a driver response system, such as a voice recognition means, which decodes spoken words to determine if a correct response from the driver has been given. This subsystem then provides a signal back to the first subsystem indicating driver response. The third subsystem performs a driver notification function dependent on the status of the signal from the second subsystem and its subsequent treatment by the first subsystem. This notification can be visual or audible, for example, an alarm to warn the driver. This third subsystem may also be integrated with a vehicle control means that can reduce engine speed or apply the vehicle brakes should the proper sequence of events be recorded. The fourth subsystem is an auxiliary sensor system which provides information from external sensors to the first subsystem to control or modify the function of other subsystems or the response criteria.

It is an object of this invention to provide an easily implemented, cost effective and highly reliable means to measure driver alertness.

It is a further object of this invention to eliminate annoying manual operations performed by the driver as may be required with prior alertness monitoring systems which could promote their disuse.

It is another object of this invention to use existing electronic control units, indicator lamps, buzzers and other devices already available on many vehicles with minor modifications to provide a measure of driver alertness.

It is another object of this invention to improve the effectiveness of a driver awareness system by using auxiliary sensors that provide additional information to optimize the function of the system.

It is another object of this invention to allow the alertness of the driver to be monitored by remote means.

Many other objects and purposes of the invention will be clear from the following detailed description of the drawings.

DETAILED DESCRIPTION OF THE DRAWINGS

Figure 1:
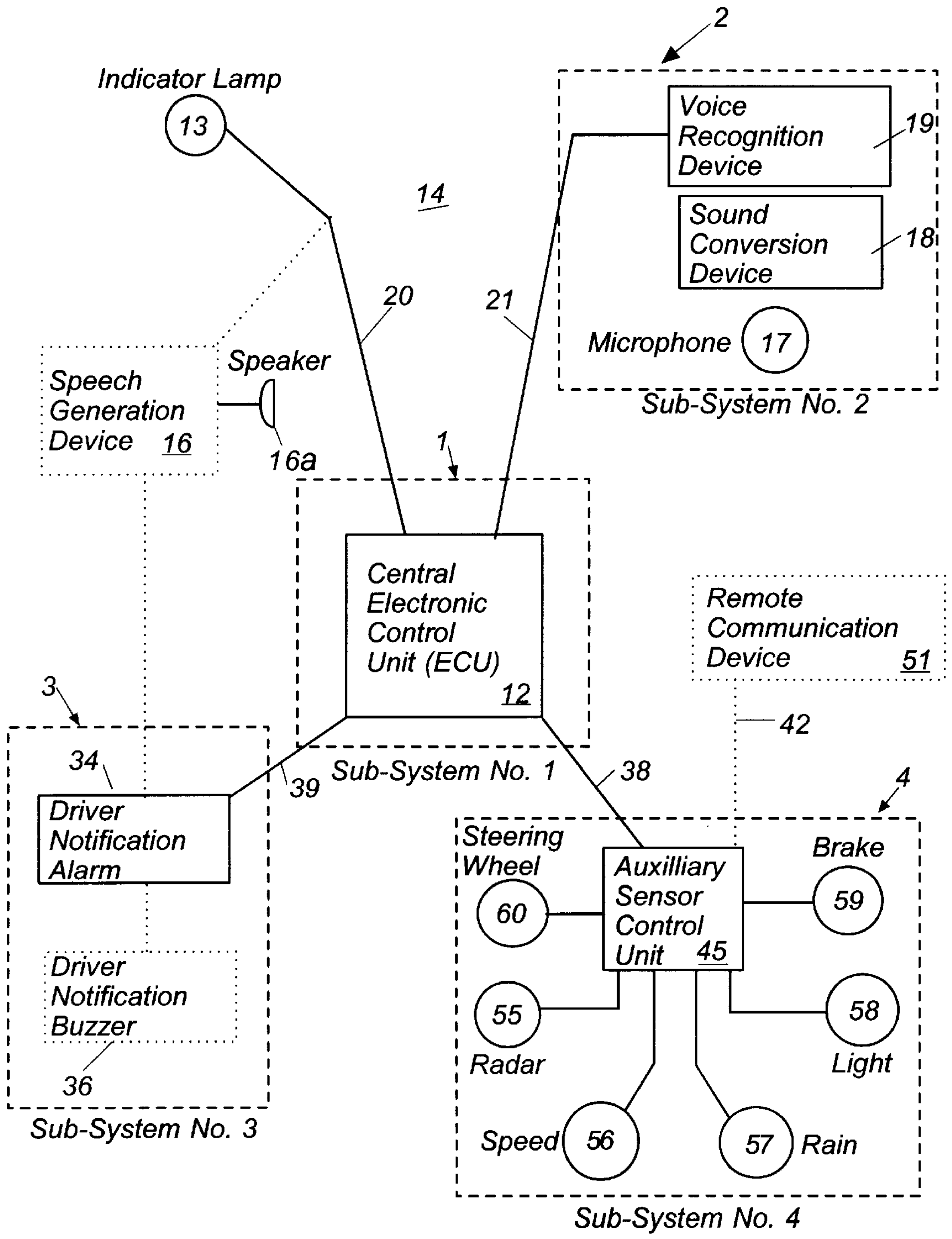
FIG. 1 is a block diagram showing the major components which make up this invention.

Reference is now made to FIG. 1. An ECU (electronic control unit) 12 serves as the central processing unit for control of the alertness monitor system 14. This ECU 12 is preferably implemented within a pre-existing part of a safety component within the vehicle, such as the electronic crash sensor, which already contains a microprocessor and suitable support circuitry to evaluate the severity of a collision, determine which restraint components need to be activated and monitor restraint system components for faults. Alternately the ECU 12 can be a separate device, however, this may increase the cost of the system. One of the components controlled by the ECU 12 through communication line 20 is a warning lamp 13. If the vehicle is already equipped with an air bag safety system, this system would most probably include a visual, diagnostic information light which provides a diagnostic indication of the readiness of the air bag system. By design, the air bag diagnostic or indicator lamp is located in an easily noticed location. In order to reduce system cost, in the present system the diagnostic indicator light can also be used as the warning lamp 13. Should the air bag system diagnostic indicator lamp not be used, an additional alertness warning lamp 13 can be located in a similarly visible location in the passenger compartment or even outside of the passenger compartment, for example on the hood of the vehicle.

At least one of these input/output circuits of the ECU 12 controls the activation of the warning lamp 13. The ECU 12 is programmed to activate the warning lamp 13, either randomly or at predetermined intervals to provide a visual interrogation signal to the driver, which may be dependent upon the status of other system components. These other components can be auxiliary sensors such as an exterior light intensity sensor which signals the ECU 12 that the vehicle is being driven at night, and therefore may require a different set of interrogation control parameters as might be required during daylight driving. The ECU 12 can provide a signal to a speech generation device 16 which, using either recorded words or synthesized speech, provides an audible interrogation signal to the driver.

Sub-system number 2 is a voice recognition system. The input circuitry of this system consists of a microphone 17 or other device to convert sound waves into electrical signals, a suitable conversion device 18 which converts the microphone signal into a form usable by the voice recognition device 19. The voice recognition system 17 may also include a speech generation device 16 and speaker **16*a*. The voice recognition circuit determines if the input signal matches a preset criteria corresponding to a limited number of acceptable words that the driver may speak in response to a visual or audible signal. For example the driver may be instructed to repeat a pre-set verbal series of words in response to the activation of the warning lamp 13 and/or repeat a series of words or sounds generated by the speech generation device 16. To reduce the processing requirements of this circuit, allowances can be made to only evaluate the microphone input signal within a predetermined time interval from when the indicator lamp or speaker was energized, for example, within 5 seconds. Similarly, it may also be required for the driver to initialize or train the speech recognition subsystem 2 by speaking predetermined words or phrases at the start of the driving cycle to provide a basis by which the recognition subsystem 2** evaluates future responses.

Communication between the control circuit of subsystem number 1 and this voice recognition subsystem 2 is provided through communication line 21. The first control subsystem 1 signals this second subsystem through this communication line, which initiates the voice recognition process. If a suitable sound is recognized by this second subsystem within the required time interval, an appropriate response is sent to the first subsystem.

The third subsystem 3 consists of a driver notification alarm 34 controlled by the first subsystem through line number 39. This notification means can be a buzzer 36, other audible alarm, or it can be a voice-based warning system available through the speech generation device 16, where either a pre-recorded or synthesized phrase is spoken to warn the driver of an improper alertness response. Part of this driver notification process is a criticality evaluation that determines successive actions dependent on other factors such as time since previous alertness notification, vehicle speed and output from the auxiliary sensors described below.

The fourth subsystem 4 consists of auxiliary sensors and a control means 45 that provide additional information for the alertness monitoring system. These auxiliary sensors serve to optimize the function of the system and to reduce annoying driver stimuli (e.g., indicator lamp activation or voice interrogation) when unnecessary. One example of an auxiliary sensor function is a speed sensor 56 which determines if stop and go type driving typical of congested traffic is occurring, during which driver alertness interrogation is not likely to be required. Also included in this system are radar sensors 55 to supply information on the proximity of external obstacles, environmental sensors that provide information on such variables as humidity or rain 57, visibility or lighting conditions 58, brake usage sensors 59 to monitor the brake pedal switch output and a steering wheel monitor 60 which provides an output signal indicative of steering wheel motion. The selection and function of these auxiliary sensors are dependent on system design requirements. The preferred embodiment includes an activation or operator activity (or inactivity) requirement for the alertness monitoring system. For example, the system would generate an alertness monitoring signal if it determined that the driver seems to be inactive for a given period of time which might indicate that the driver was about to fall asleep. More specifically, the system 14 could monitor steering wheel position and imply that if the position of the steering has not changed within a predetermined period of time the driver might have fallen asleep. Alternately, the system may monitor steering position to determine erratic driver behavior. Similarly, the system might also interrogate the radar and brake pedal sensor to determine if the driver has been applying the vehicle brake within a determinable time period of the radar detector identifying a roadway obstacle. Further, the generation of any driving alertness signal would be inhibited when the system determines that the driver was active and alert such as by monitoring that the vehicle was continuously changing speeds such as may be encountered during heavy traffic or stop-and-go type conditions.

Also included with this auxiliary sensor system is an optional external communication device 51, which can either process data received from a remote location, such as a dispatcher, or which can send information to a remote location for tracking or other action. As an example, the external communication device 51 could be instructed by control subsystem 1 to transmit a signal to a dispatcher that acceptable alertness responses from the driver have not been received, thereby prompting the dispatcher to issue a radio warning to the driver.

Figure 2:
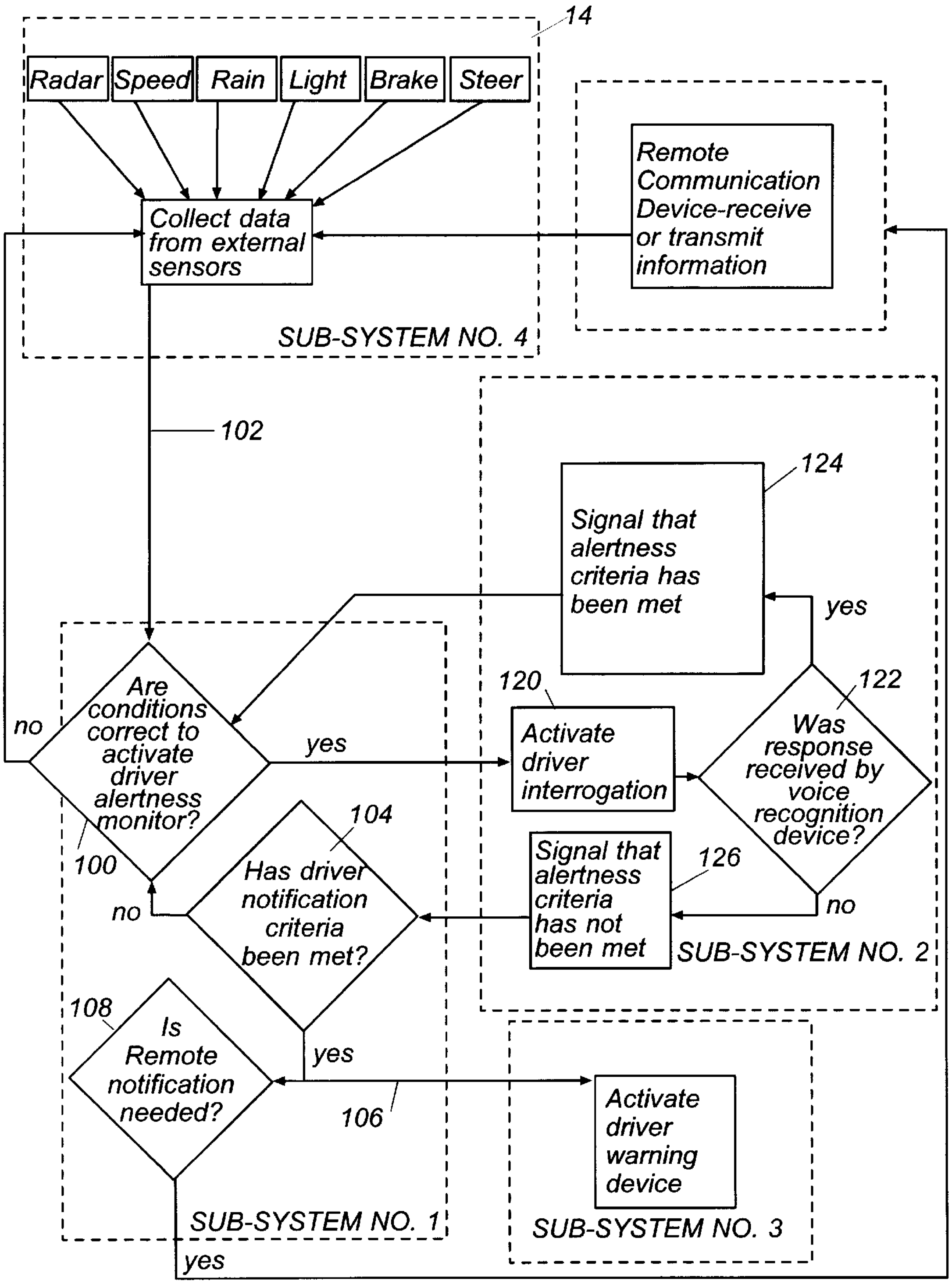
FIG. 2 is a decision tree which illustrates the function of this invention.

Reference is now made to FIG. 2, which illustrates a logic decision tree typical for the system. The decision criteria illustrated are only for one preferred embodiment, and should not be considered all-inclusive.

Reference is first made to sub-system number 1 of the logic tree. The circuit determines if conditions are such that driver notification should be performed (block 100). The input from the auxiliary sensors in sub-system number 4 to sub-system number 1 provides this type of information (block 102). In its simplest form, driver notification can be generated periodically based on a simple clock signal where the only parameter is for example, the time since the vehicle was started. Alternately, a random time function could be used to determine when driver interrogation is performed. A more sophisticated system could determine that vehicle speed and steering wheel movement have been steady for too long a period, and thereby imply that driver drowsiness is occurring. Subsystem number 1 determines when the driver notification is to occur (block 104). This notification signal is then sent to subsystem number 2 (block 106).

Subsystem number 2 contains the components needed to provide an interrogation to the driver (block 120) and determine if a response is received (block 122) such as a voice response from the driver received via microphone 11. In the preferred embodiment, this subsystem would, as mentioned above, contain both the speech generation and recognition components. Subsystem number 2 then responds to the command issued from subsystem number 1 with a signal that corresponds to the driver's action (blocks 124, 126). Dependent on the state of this communication, subsystem number 2 determines if the response was satisfactory (block 124). If a satisfactory response was received, the process is periodically repeated by subsystem number 1 (dependent on auxiliary data received from subsystem number 4).

Should a proper response from subsystem 2 not be received by subsystem number 1, then a determination of alternate action is made. This alternate action can be taken based upon the data received from the auxiliary sensors. For example, vehicle speed and proximity to external obstacles may change this alternate action, which can range from simply repeating the interrogation to an extreme reaction such as sounding the horn or applying vehicle brakes to reduce speed. Similarly, sub-system number 1 can determine if remote notification is needed if, for example, the driver response is becoming successively delayed with each interrogation, implying that drowsiness may be increasing. A remote notification can thereby result in a radio communication or cellular telephone call from a central control location, for example, a dispatcher.

Many changes and modifications in the above described embodiment of the invention can, of course, be carried out without departing from the scope thereof. Accordingly, that scope is intended to be limited only by the scope of the appended claims.

What is claimed is:

1. A driver alertness monitoring system (14) for motor vehicles including:

first means for generating at least one interrogation signal to a driver of a vehicle;

second means for monitoring the driver reactions to the interrogation signal;

third means for determining if the driver is sufficiently alert to drive the vehicle; and fourth means for at least interacting with the driver to generate a warning signal to inform the driver of his or her state of alertness; and a collision warning system capable of providing a pending collision signal indicative of the existence of a potential roadway hazard and wherein the second means includes means for monitoring the reaction of the driver in response to the pending collision signal and for causing the alertness monitoring systems to interrogate the driver if his reaction time is below a predetermined level.

2. A driver alertness monitoring system (14) for motor vehicles including:

first means for generating at least one interrogation signal to a driver of a vehicle;

second means for monitoring the driver reactions to the interrogation signal;

a collision warning system capable of providing a pending collision signal indicative of the existence of a potential roadway hazard and wherein the second means includes means for monitoring the reaction of the driver in response to the pending collision signal and for causing the alertness monitoring systems to interrogate the driver if his reaction time is below a predetermined level.

* * * * *